United States Patent [19]

Mason et al.

[11] Patent Number: 4,530,637
[45] Date of Patent: Jul. 23, 1985

[54] WORKPIECE HANDLING APPARATUS

[75] Inventors: Arthur C. Mason, Warren; William M. Faitel, Pontiac; James M. Haselhuhn, Troy, all of Mich.

[73] Assignee: Lamb Technicon Corp., Warren, Mich.

[21] Appl. No.: 508,617

[22] Filed: Jun. 28, 1983

[51] Int. Cl.³ .......................... B65H 5/08; B23Q 7/04
[52] U.S. Cl. ...................................... 414/750; 74/103; 198/486; 198/488; 414/733; 414/737; 414/752
[58] Field of Search ................ 414/72, 626, 707, 710, 414/714, 733, 737, 749, 750, 751, 752, 917, 905; 74/84 R, 103, 436, 820; 100/207; 198/488, 486, 621, 774

[56] References Cited

U.S. PATENT DOCUMENTS

| 1,766,573 | 6/1930 | Westin | 414/733 |
| 3,902,606 | 9/1975 | Ronbeck | 414/737 X |
| 4,299,533 | 11/1981 | Ohnaka | 414/752 |
| 4,370,092 | 1/1983 | Healy | 414/752 |
| 4,377,953 | 3/1983 | Hagen | 74/820 X |
| 4,411,587 | 10/1983 | Niki | 414/752 |
| 4,441,852 | 4/1984 | Dixon | 414/917 X |
| 4,462,741 | 7/1984 | Sogawa et al. | 414/752 X |

Primary Examiner—Leslie J. Paperner
Assistant Examiner—Lyle Kim
Attorney, Agent, or Firm—Barnes Kisselle Raisch Choate Whittemore & Hulbert

[57] ABSTRACT

A mechanism for loading workpieces into and/or unloading workpieces from a stamping press has a workpiece carrying arm and includes a drive mechanism for reciprocating the arm horizontally through a desired stroke and for reciprocating the arm vertically adjacent the opposite ends of its stroke. The drive mechanism comprises a crank for shifting the arm horizontally and a second crank for shifting the arm vertically. The cranks are operated sequentially and in timed relation by a pair of Geneva wheels driven by a motor-operated program wheel.

12 Claims, 11 Drawing Figures

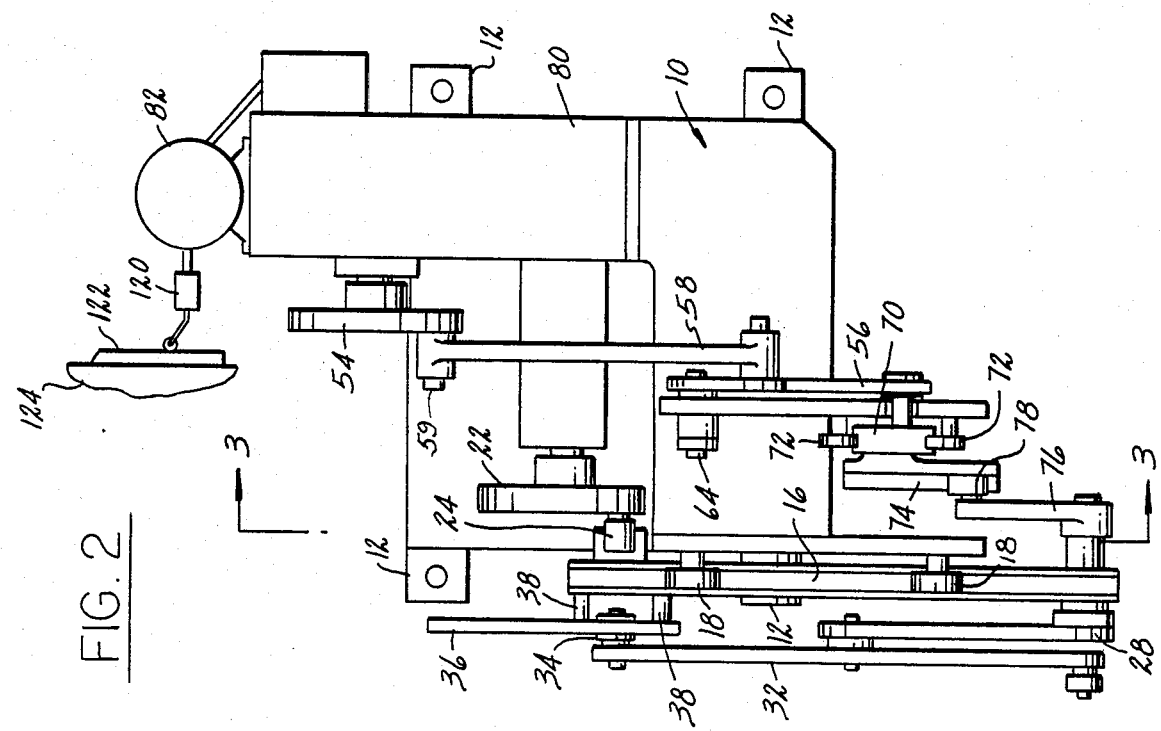
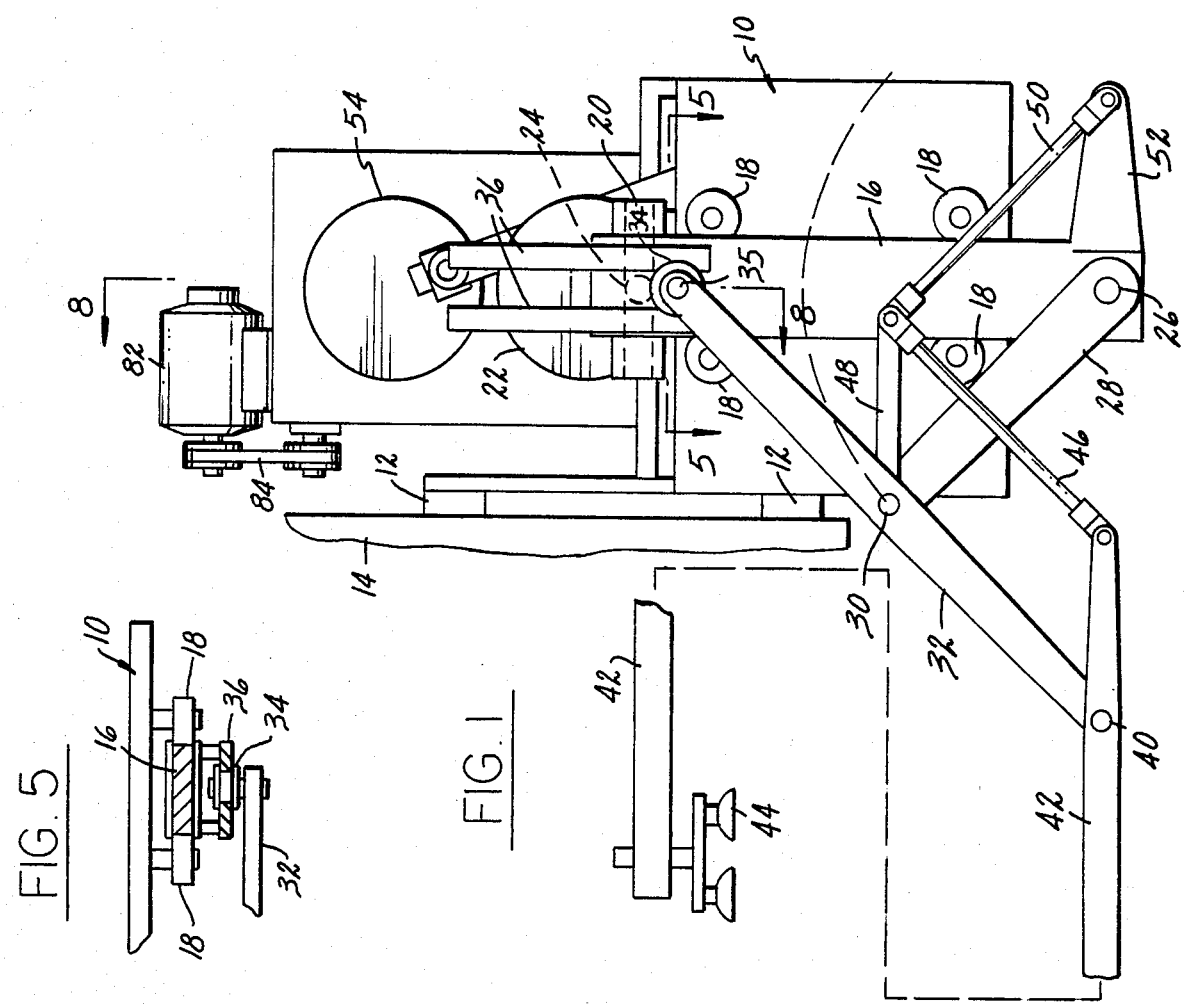

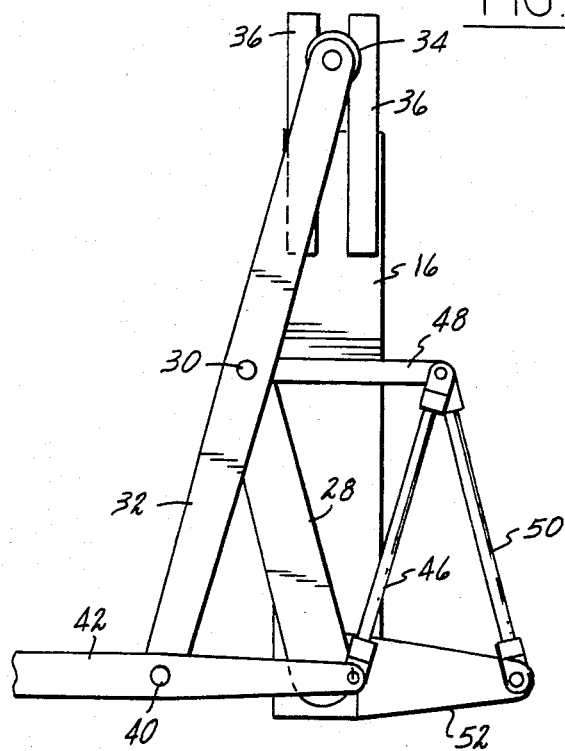
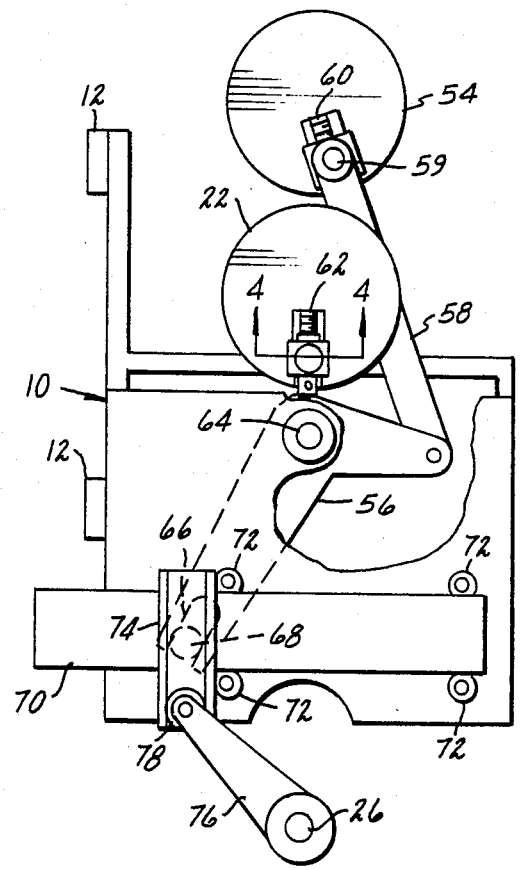
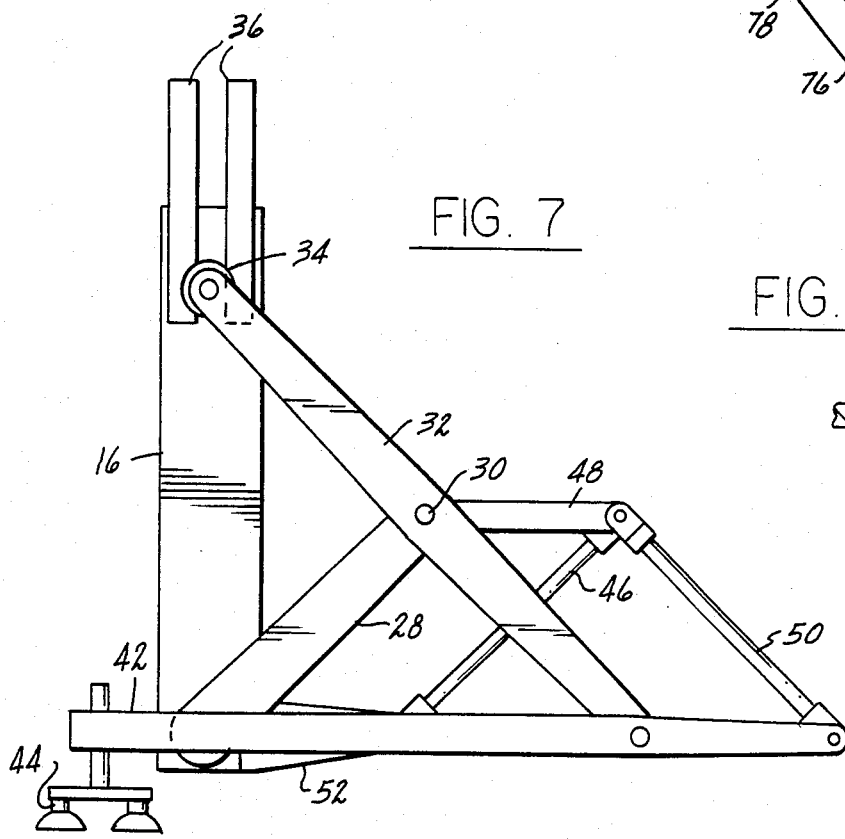
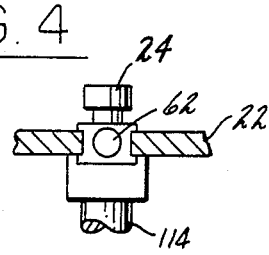

4,530,637

WORKPIECE HANDLING APPARATUS

FIELD OF THE INVENTION

This invention relates to a workpiece handling apparatus of the type usable for loading a workpiece into or removing it from a press.

BACKGROUND OF THE INVENTION

In the operation of stamping presses, especially in connection with a single station die, economies are frequently obtained when a device is provided for automatically depositing workpieces into and removing them from the die area of the press. A workpiece handling device of this general type is normally designed to lift a workpiece through a short distance, carry it in a relatively long horizontal path into the die area of the press and then lower it to deposit it in the die. To remove a workpiece from the press the device operates in the reverse manner. In practice a device of this type is frequently utilized on opposite sides of the press, one for picking up blanks from a conveyor and depositing them into the press and the other for removing workpieces from the press and depositing them on another conveyor.

At the present time numerous different types of such press loaders and unloaders are used. However, as presently designed most of such devices are objectionable for one reason or another. Some are of complicated and costly construction. Others require the operation of several hydraulic or pneumatic cylinders. Still others do not produce reliable and trouble-free operation over extended periods of time.

SUMMARY OF THE INVENTION

The primary object of the present invention resides in the provision of a workpiece handling device of the type described which is of relatively simple and economical construction. At the same time, the device of the present invention is designed to be operated mechanically by means of an electric motor to produce reliable operation over extended periods of time.

The preferred embodiment of the work handling device of the present invention comprises a workpiece transfer arm which is operated by a conventional Scott-Russell linkage for movement in a horizontal path, the arm being mounted on a vertically reciprocating slide to impart vertical displacement to the arm adjacent each end of its horizontal stroke. Timing of the horizontal and vertical displacements of the arm to obtain smooth operation of the device is achieved through the use of two Geneva wheels operated intermittently in timed sequence by a single rotary driver.

BRIEF DESCRIPTION OF THE DRAWINGS

The objects, features, advantages and embodiments of the present invention will become apparent from the following description and accompanying drawings, in which:

FIG. 1 is a side elevational view of a work handling device according to the present invention;

FIG. 2 is a front elevational view of the device;

FIG. 3 is a sectional view taken along the line 3—3 in FIG. 2;

FIG. 4 is a fragmentary sectional view taken along the line 4—4 in FIG. 3;

FIG. 5 is a fragmentary sectional view taken along the line 5—5 in FIG. 1;

FIGS. 6 and 7 are elevational views showing progressive positions of the link and lever assembly illustrated in FIG. 1;

Referring to FIGS. 1 and 2, the device includes a support base 10 adapted to be mounted by means of four pads 12 to one side of a press, a portion of which is shown at 14. A slide 16 is guided for vertical movement on base 10 by means of four rollers 18. Adjacent its upper end and on the inner face thereof slide 16 has rigidly secured thereto a horizontally slotted bar 20. A rotary driven crank wheel 22 has a roller 24 journalled thereon which is engaged in the horizontal slot of bar 20. In response to rotation of crank wheel 22, slide 16 is reciprocated vertically.

Figure 9:
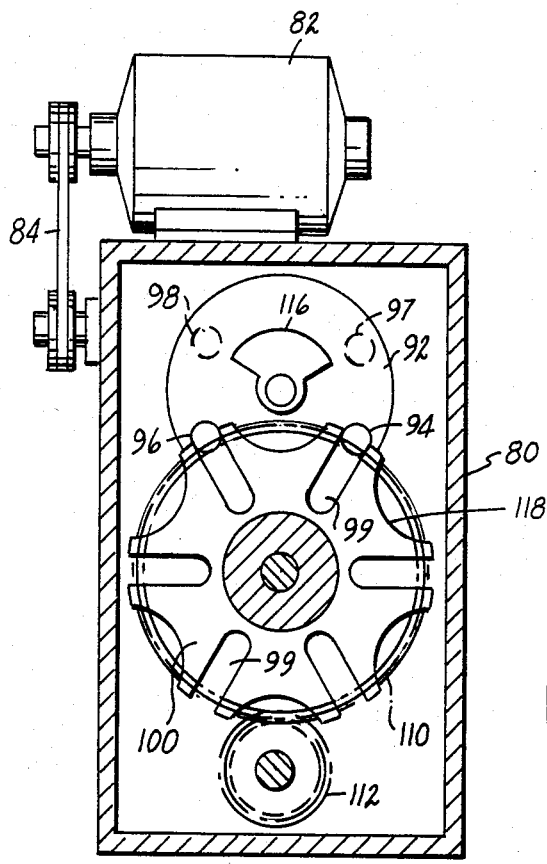
FIG. 9 is a sectional view of the drive assembly taken along the line 9—9 in FIG. 8.

Adjacent the lower end of slide 16 there is journalled a shaft 26 to which an end of a lever 28 is keyed. The opposite end of lever 28 is pivotally connected, as at 30, to the mid point of a link 32. The upper end of link 32 has a roller 34 journalled thereon, as at 35, which is guided for vertical movement between a pair of guide bars 36 that are mounted on slide 16 by spacers 38. The lower end of link 32 is pivotally connected as at 40 with a work transfer arm 42. The length of lever 28 is equal to one-half the length of link 32. The distal end of arm 42 is provided with suitable means for gripping a workpiece. In the embodiment illustrated these means are in the form of suction cups 44. The lever and link assembly thus far described comprises the classic Scott-Russell linkage which, when powered by shaft 26, will cause the pivot connection 40 to travel in a straight horizontal path. In order to maintain a horizontal orientation for the transfer arm, a parallelogram linkage consisting of links 46, 48, 50 is utilized. Link 50 is anchored to slide 16 by means of an extension 52.

In FIG. 3 there is illustrated the arrangement employed for oscillating shaft 26 on which the lever 28 is keyed. This arrangement includes a crank wheel 54 which is connected to one end of a bellcrank 56 by means of a link 58. The end 59 of link 58 connected to crank wheel 54 can be adjusted radially of the crank wheel by means of a threaded screw 60. In a similar manner, roller 24 can be adjusted radially on crank wheel 22 by means of a threaded screw 62. Bellcrank 56 is pivotally supported on base 10 as at 64. The lower end of bell crank 56 is slotted as at 66 to slideably accommodate a pin follower 68 fixedly mounted on a horizontal slide 70. Slide 70 is guided for horizontal movement on base 10 by means of rollers 72. Slide 70 has a vertically grooved bar 74 fixedly mounted thereon. A lever 76 has one end keyed to the inner end of shaft 26 and at its opposite end supports a roller 78 that is engaged in the vertically slotted bar 74. With this crank and link arrangement when crank wheel 54 is rotated in one direction, lever 76 and shaft 26 are angularly oscillated, the angle through which they oscillate being variable in accordance with the adjustment of screw 60.

With the arrangement thus far described it will be appreciated that when crank wheel 22 rotates and reciprocates slide 16 vertically, roller 34 travels vertically between guide bars 36 and the transfer arm 42, together with the Scott-Russell Linkage, will be shifted vertically. When crank wheel 54 is rotated to oscillate lever 76 and shaft 26, the Scott-Russell linkage will be driven from the position shown in FIG. 1 to the position shown in FIG. 7 and then back to the position shown in FIG. 1. An intermediate position of the Scott-Russell linkage is illustrated in FIG. 6. At the mid point position of the work transfer arm 42, link 32 and lever 28 will assume a straight vertical position. This occurs when the crank wheel 54 has rotated through 90° from the position shown in FIG. 3.

Figure 8:
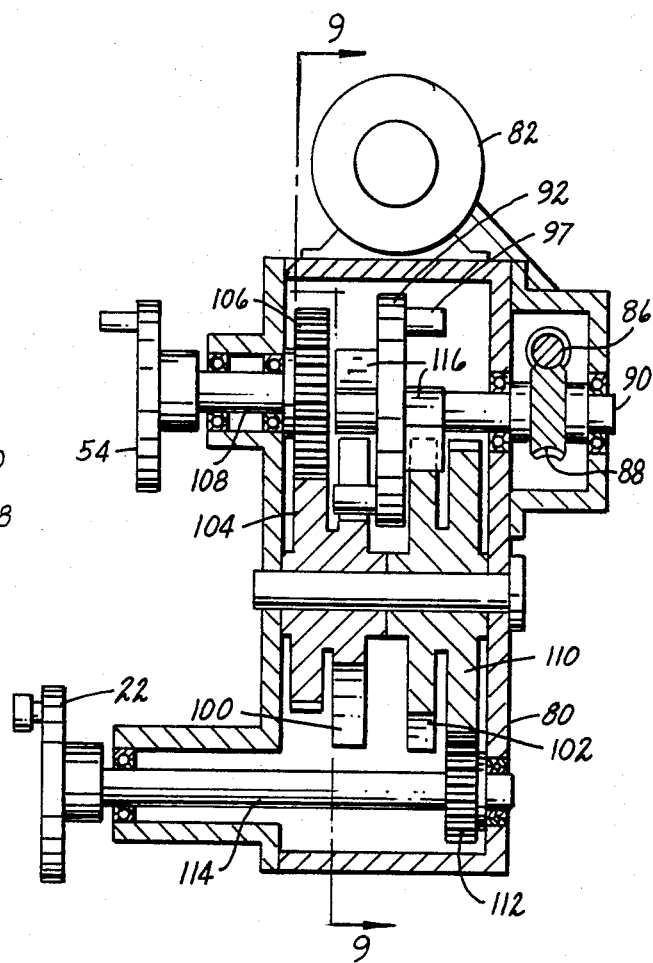
FIG. 8 is a sectional view of the drive assembly taken along the line 8—8 in FIG. 1.

The drive assembly, that is, the mechanism for rotating crank wheels 22,54, is best illustrated in FIGS. 8 and 9. The drive assembly is enclosed within a housing 80 and is driven by an electric motor 82. A belt drive 84 from motor 82 rotates a worm 86 which meshes with a gear 88 keyed to a shaft 90. A program wheel 92 is fixedly mounted on the end of shaft 90 within housing 80. Two pins 94,96 are mounted on one face of program wheel 92, the pins being spaced apart circumferentially 120°. Two pins 97,98 are similarly mounted on the opposite face of wheel 92. The two sets of pins are symmetrically offset radially from each other as best shown in FIG. 9. Pins 94,96 are adapted to rotate a Geneva wheel 100 and pins 97,98 are arranged to rotate a similar Geneva wheel 102. Geneva wheel 100 is formed integrally with a gear 104 in mesh with a gear 106 keyed to the shaft 108 which rotates crank wheel 54. Gear 104 has a diameter one and a half times the diameter of gear 106. Geneva wheel 102 is formed integrally with a gear 110 in mesh with a gear 112 keyed to the shaft 114 which drives crank wheel 22. The diameter of gear 110 is three times that of gear 112.

The Geneva wheels illustrated operate in the conventional manner. Each pin 94,96 will engage the radial slots 99 of the Geneva wheel 100 and rotate it one-sixth of a revolution. Likewise, the pins 97,98 will engage the radial slots 99 of the other Geneva wheel 102 and rotate it one-sixth of a revolution. When neither of the pins are engaged in the slots of its respective Geneva wheel, the Geneva wheel is held stationary by the interengagement of a circular segment boss 116 with an arcuate concavity 118 on the periphery of the Geneva wheel between successive slots 99.

In the arrangement illustrated, since the ratio between gears 110 and 112 is 3:1 and the ratio between gears 104 and 106 is 1.5:1, it therefore follows that crank wheel 22 rotates through two revolutions during a single revolution of crank wheel 54. It also follows that, since the two sets of pins 94,96 and 97,98 are symmetrically offset radially from one another and since the pins in each set are circumferentially spaced 120° apart, during each revolution of program wheel 92 each wheel 100,102 will rotate by itself during a portion of the cycle and the two wheels will rotate symmetrically during another portion of the cycle.

Figure 10:
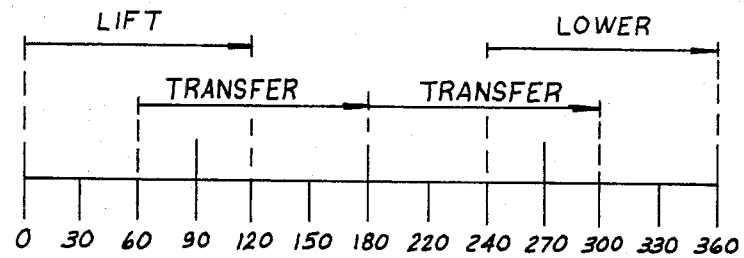
FIG. 10 is a timing diagram of the invention.
Figure 11:
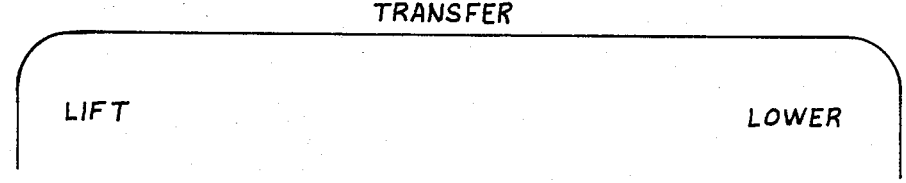
FIG. 11 shows the path of travel of the work transfer arm of the device.

The sequential and concurrent operation of the two crank wheels 22,54 is best illustrated in the timing diagram illustrated in FIG. 10 which depicts the horizontal and vertical movements of arm 42 for one complete revolution of program wheel 92. In this diagram the 180° position corresponds to the mid stroke position of the work transfer arm. At this position program wheel 92 has rotated to the position shown in FIG. 9 where pin 96 is entering a slot 99 and pin 94 is exiting a slot 99. When wheel 92 rotates through another 120° from the position shown in FIG. 9, Geneva wheel 100 will be rotated through 60° (the position shown at 300° in FIG. 10) and crank wheel 54 will be rotated through 90°. Thus, the work transfer arm 42 will be shifted from its mid stroke position to one end of its stroke. Moreover, after program wheel 92 has rotated through the first 60° of this 120°, pin 98 will engage a slot 99 in Geneva wheel 102 so that during the second 60° rotation of program wheel 92 Geneva wheel 102 and gear 110 will be rotated through 30° which produces a 90° rotation of crank wheel 22 which begins to shift slide 16 to lower the transfer bar 42. Then, as the program wheel 92 continues to rotate through the next 60° segment, crank wheel 22 will be rotated through another 90° to shift slide 16 and the work transfer bar 42 to the lowermost position. In a similar manner, if the rotation of program wheel 92 is continued, the transfer bar will be first lifted and then shifted horizontally back to the mid point of its stroke.

Normally the time cycle for the work handling mechanism is less than the time required for a complete cycle of a single stroke press. Under these circumstances, in order to synchronize the operation of the work handling apparatus with the operation of the press, it becomes necessary to intermittently stop the operation of the work handling apparatus. This "dwell" is most conveniently timed so as to occur when the work transfer arm is near the center of its stroke where the work gripping device (such as the suction cups 42) will not be located within the press nor over the automation for feeding the sheet metal blanks toward and away from the loading and unloading stations, respectively, adjacent the press. Thus, it is desirable to cause the dwell to occur when the press ram is adjacent the lower end of its stroke and to initiate operation of the work handling device when the press ram is adjacent the upper end of its stroke. Any suitable means may be employed for operating motor 82 only when the press ram is adjacent the upper end of its stroke. In FIG. 2 these means are shown schematically as a switch 120 controlling motor 82 and operated by a cam 122 mounted on a vertically reciprocating portion 124 associated with the press ram.

We claim:

1. A work handling device comprising a support, a vertically reciprocable slide on said support, a work transfer arm mounted on said slide for horizontal movement, a first rotatable member on said support which when rotated reciprocates the slide vertically through a predetermined stroke, a second rotatable member on said support which when rotated reciprocates the transfer arm horiozntally through a predetermined stroke, a motor, a pair of Geneva wheels having a driving connection, one with each of said rotatable members, means driven by said motor for rotating the Geneva wheels with a Geneva motion, and the driving connection between the motor-driven means and said Geneva wheels being constructed and arranged such that adjacent the opposite ends of the stroke of the transfer arm the Geneva wheel controlling reciprocation of the slide is first rotated through a predetermined angle and then both Geneva wheels are rotated through a predetermined angle, then the rotation of the Geneva wheel controlling the reciprocation of the slide is arrested and the rotation of the other Geneva wheel is continued.

2. The combination called for in claim 1 wherein each rotatable member is designed to rotate through one complete revolution to reciprocate the slide and the work transfer arm through one complete stroke.

3. The combination called for in claim 1 wherein the driving connections between the Geneva wheels and the rotatable members comprise gear trains.

4. The combination called for in claim 3 wherein said gear trains have gear ratios such that the first rotatable member rotates through two revolutions for each revolution of the second rotatable member.

5. The combination called for in claim 1 wherein the motor-driven means are arranged relative to the Geneva wheels such that both Geneva wheels are operated simultaneously during a portion of each revolution thereof.

6. The combination called for in claim 1 wherein said work transfer arm and said second rotatable member are interconnected by a Scott-Russell linkage mounted on said slide.

7. The combination called for in claim 1 including a crank pivotably supported on said slide and having a driving connection with said work transfer arm, a second slide mounted on said support for horizontal reciprocation, means interconnecting the second rotatable member with said second slide to reciprocate the second slide horizontally when the second rotatable member is rotated, said second slide having a vertical guideway thereon, said lever having an end portion thereof engaging said vertical guideway.

8. The combination called for in claim 7 including a Scott-Russell linkage mounted on said first slide and driven by said lever.

9. A work handling device for transferring a workpiece comprising a support, a slide on said support reciprocable along a first substantially straight line path, a work transfer arm carried by said slide for movement along a second substantially straight line path generally transverse to said first straight line path, a first rotatable member carried by said support which when rotated reciprocates said slide through a predetermined stroke along said first path, a second rotatable member carried by said support which when rotated reciprocates said transfer arm through a predetermined stroke along said second path, a pair of Geneva wheels each having a driving connection with one of said rotatable members, a motor, means driven by said motor for rotating said Geneva wheels with a Geneva motion, and said means and driving connections being constructed and arranged such that adjacent the opposite ends of the stroke of the transfer arm the Geneva wheel controlling reciprocation of said slide is first rotated through a predetermined angle of rotation, then both Geneva wheels are rotated through predetemined angles of rotation, then the rotation of the Geneva wheel controlling reciprocation of said slide is arrested and the rotation of the other Geneva wheel is continued, whereby said slide is moved along said first path and said transfer arm is moved along said second path.

10. The combination called for in claim 9 wherein said means and driving connections are constructed and arranged to rotate each of said rotatable members through one complete revolution to reciprocate the slide and the work transfer arm through one complete stroke.

11. The combination called for in claim 9 wherein said driving connections comprise gear trains having gear ratios such that the first rotatable member rotates through two revolutions for each revolution of the second rotatable member.

12. The combination called for in claim 9 wherein the driving connection between said work transfer arm and said second rotatable member comprises a Scott-Russell linkage carried by said slide.

* * * * *